United States Patent
Taya et al.

(10) Patent No.: US 10,526,109 B2
(45) Date of Patent: Jan. 7, 2020

(54) SURFACE-TREATED STEEL SHEET FOR CONTAINER HAVING EXCELLENT PROCESSING ADHESION TO RESIN, METHOD FOR MANUFACTURING SAME, AND CAN

(71) Applicant: TOYO KOHAN CO., LTD., Tokyo (JP)

(72) Inventors: Shinichi Taya, Yamaguchi (JP); Hiroshi Doi, Yamaguchi (JP); Etsuro Tsutsumi, Yamaguchi (JP); Kota Sadaki, Yamaguchi (JP); Masahiro Kai, Tokyo (JP)

(73) Assignee: TOYO KOHAN CO., LTD., Tokyo (JP)

( * ) Notice: Subject to any disclaimer, the term of this patent is extended or adjusted under 35 U.S.C. 154(b) by 680 days.

(21) Appl. No.: 14/404,591

(22) PCT Filed: May 24, 2013

(86) PCT No.: PCT/JP2013/064470
§ 371 (c)(1),
(2) Date: Nov. 28, 2014

(87) PCT Pub. No.: WO2013/180027
PCT Pub. Date: Dec. 5, 2013

(65) Prior Publication Data
US 2015/0111057 A1   Apr. 23, 2015

(30) Foreign Application Priority Data

May 29, 2012 (JP) ................................. 2012-121731

(51) Int. Cl.
*B32B 15/01* (2006.01)
*B65D 25/14* (2006.01)
(Continued)

(52) U.S. Cl.
CPC .............. *B65D 7/42* (2013.01); *B32B 15/015* (2013.01); *B65D 25/14* (2013.01); *C22C 19/03* (2013.01);
(Continued)

(58) Field of Classification Search
USPC .......... 428/624–626, 678–680; 205/271–280
See application file for complete search history.

(56) References Cited

U.S. PATENT DOCUMENTS 3,932,144 A * 1/1976 Matsubara ............... B05D 5/10
428/418
6,248,456 B1 * 6/2001 Yamane .................... C09D 5/08
428/626

(Continued)

FOREIGN PATENT DOCUMENTS

JP   H02-101200    *  4/1990
JP   2000-226676 A   8/2000
(Continued)

OTHER PUBLICATIONS

English machine translation of JP 2007-231394, JPO, accessed Apr. 30, 2015.*
(Continued)

*Primary Examiner* — Humera N Sheikh
*Assistant Examiner* — Xiaobei Wang
(74) *Attorney, Agent, or Firm* — Intellectual Property Law Group LLP

(57) ABSTRACT

Provided is a container-use surface treated steel sheet which is manufactured without using chromium and exhibits excellent working adhesion with a coated organic resin, a method of manufacturing the container-use surface treated steel sheet, an organic resin coated surface treated steel sheet. The container-use surface treated steel sheet is a surface treated steel sheet where nickel plating is applied to at least one-side
(Continued)

surface of surfaces of a steel sheet by coating, wherein nickel plating has a fine particle shape formed by fine particles which has particle density of 2 to 500 pieces/μm² and having an average particle size of 0.05 to 0.7 μm. The container-use surface treated steel sheet is also characterized in that a coating weight of the nickel plating of the container-use surface treated steel sheet is 0.1 to 12 g/m², metal tin is contained in coating of the nickel plating, and an amount of metal tin is 0.05 to 0.1 g/m². The organic-resin-coated surface treated steel sheet of the present invention is characterized in that an organic resin layer is formed on at least one surface of the container-use surface treated steel sheet. The metal can is formed by working the organic-resin-coated surface steel sheet.

9 Claims, 13 Drawing Sheets

(51) Int. Cl.
    *C25D 5/48*     (2006.01)
    *C25D 3/12*     (2006.01)
    *C25D 3/56*     (2006.01)
    *B65D 6/00*     (2006.01)
    *C25D 7/06*     (2006.01)
    *C22C 38/00*     (2006.01)
    *C22C 38/02*     (2006.01)
    *C22C 38/04*     (2006.01)
    *C22C 38/06*     (2006.01)
    *C22C 19/03*     (2006.01)
    *C22F 1/10*     (2006.01)
    *C25D 3/30*     (2006.01)

(52) U.S. Cl.
    CPC ............ *C22C 38/001* (2013.01); *C22C 38/02* (2013.01); *C22C 38/04* (2013.01); *C22C 38/06* (2013.01); *C22F 1/10* (2013.01); *C25D 3/12* (2013.01); *C25D 3/562* (2013.01); *C25D 5/48* (2013.01); *C25D 7/0614* (2013.01); *Y10T 428/12049* (2015.01); *Y10T 428/12063* (2015.01); *Y10T 428/12076* (2015.01)

(56) References Cited

U.S. PATENT DOCUMENTS

| | | | | |
|---|---|---|---|---|
| 6,528,181 | B1* | 3/2003 | Yamane | B05D 7/14 428/626 |
| 2013/0034745 | A1* | 2/2013 | Tachiki | B32B 15/015 428/679 |
| 2013/0130055 | A1* | 5/2013 | Miyamoto | C23C 28/021 428/626 |
| 2013/0216714 | A1* | 8/2013 | Suzuki | B32B 1/08 427/353 |

FOREIGN PATENT DOCUMENTS

| | | | | |
|---|---|---|---|---|
| JP | 2001262371 | * | 9/2001 | |
| JP | 2001-288585 A | | 10/2001 | |
| JP | 2004-095497 A | | 3/2004 | |
| JP | 2005-256014 A | | 9/2005 | |
| JP | 2007-231394 A | | 9/2007 | |
| JP | 2009-010407 A | | 1/2009 | |
| JP | 2010-031348 A | | 2/2010 | |
| JP | 2012-062509 | * | 3/2012 | |
| JP | 2012-062521 | * | 3/2012 | |
| WO | WO2011/118588 | * | 9/2011 | |
| WO | WO 2011/118846 | * | 9/2011 | C23C 28/00 |

OTHER PUBLICATIONS

International Search Report, dated Aug. 27, 2013 for corresponding International Application No. PCT/JP2013/064470 with English translation.

\* cited by examiner

SURFACE-TREATED STEEL SHEET FOR CONTAINER HAVING EXCELLENT PROCESSING ADHESION TO RESIN, METHOD FOR MANUFACTURING SAME, AND CAN

CROSS-REFERENCE TO RELATED APPLICATIONS

This application is a U.S. National Phase application, under 35 U.S.C. § 371, of International Application no. PCT/JP2013/064470, with an international filing date of May 24, 2013, and claims benefit of Japan Application no. 2012-121731 filed on May 28, 2012, and which are hereby incorporated by reference for all purposes.

TECHNICAL FIELD

The present invention relates to a resin coated steel sheet where a resin is applied to a nickel plated steel sheet by coating, and more particularly to a chromium-free organic resin coated surface treated steel sheet for food and beverage exhibiting excellent adhesion of an organic resin layer after working when the working is applied to the surface treated steel sheet, and a metal can formed by using such an organic resin coated surface treated steel sheet.

BACKGROUND ART

With respect to metal containers used in food and beverage fields, in consideration of an affect of chemical substance contained in products on human bodies and from a viewpoint of reduction of burden imposed on a global environment in manufacturing steps, a steel sheet used for manufacturing such metal containers has been shifting to a resin coated steel sheet coated with a polyester resin from a painted steel sheet.

In the metal can field, a 2-piece-type can where a can barrel and a bottom rid are integrally formed becomes a mainstream from a conventional 3-piece-type can which is constituted of a can barrel, a top lid and a bottom lid. As a result, a wall thickness of a can barrel portion is reduced thus promoting the saving of resources. A 2-piece can exhibits high degree of working on a side wall thereof compared to a 3-piece can and hence, the 2-piece can requires an excellent adhesive strength between a steel sheet and a coated resin.

As a method of forming a resin-coated 2-piece can, drawing forming, drawing-redrawing forming, stretch drawing forming, stretch ironing forming and drawing-ironing forming are named. In manufacturing a 2-piece can manufactured by using such a resin coated steel sheet, currently, an electrolytic chromium plated steel sheet having excellent adhesion between a base material and a coated resin after working is used. However, in view of the recent flow of placing emphasis on the protection of the environment, there has been a demand for the development of a surface plated steel sheet for a resin-coated steel sheet containing no chromium by not using hexavalent chromium in manufacturing steps of the steel sheet while ensuring excellent adhesion between a steel sheet and a coated resin layer after working.

In food and beverage fields, as a surface treated steel sheet having adhesion without using chromium, a nickel plated steel sheet is used. As a method of enhancing such adhesion, the formation of an uneven shape on a surface of nickel plating has been studied.

As the prior art where a surface of nickel plating of a can-use surface treated steel sheet is formed into an uneven shape, the following methods are known.

For example, patent literature 1 (JP-A-2000-226676) discloses a method where in manufacturing a laminated welding-use steel sheet having excellent weldability, excellent corrosion resistance and excellent film adhesion, tin plating is performed after nickel plating, a nickel-based plating layer and Sn are formed into an alloy by tin melting processing thus enhancing corrosion resistance, and island-like tin is formed thus enhancing adhesion of a film at high temperature.

Patent literature 2 (JP-A-2001-288585) discloses a method where in manufacturing a welded-can-use plated steel sheet which can be welded without removing film particularly, electric tin plating is applied to a steel sheet after forming a nickel diffusion layer, and an SN—Fe—Ni alloy layer is formed by reflow processing, and tin is coagulated by a surface tension of molten steel thus forming island-like tin.

Patent literature 3 (JP-A-2005-256014) discloses a method where nickel-based plating formed of Ni or Fe—Ni alloy plating is applied to a steel sheet to which nitriding processing is applied, Sn plating is performed, and tin melting processing is performed after Sn plating thus forming an Sn—Fe alloy layer or an Sn—Fe—Ni alloy layer containing nitrogen, and island-like tin is formed in an industrially stable manner due to an effect of a nitriding layer.

Further, Patent literature 4 (JP-A-2004-095497) discloses a method where in manufacturing a cathode-can-use steel sheet raw material of an alkali cell, Ni—P plating is applied to the steel sheet raw material, and heat treatment is applied after plating an $Ni_3P$ intermetallic compound is dispersed thus forming an extremely fine uneven surface on the steel sheet.

PRIOR ART DOCUMENTS

Patent Documents

Patent document 1: JP-A-2000-226676
Patent document 2: JP-A-2001-288585
Patent document 3: JP-A-2005-256014
Patent document 4: JP-A-2004-095497

SUMMARY OF THE INVENTION

Problems that the Invention is to Solve

However, with respect to the method described as the prior art where the island-like tin layer is formed on the nickel-based plating layer or the method described as the prior art where the surface of the steel sheet is formed into an uneven surface by Ni plating containing an $Ni_3P$ intermetallic compound, in the comprehensive evaluation of performances such as organic resin adhesion when drawing or drawing-ironing working is applied to the steel sheet, it is not safe to say that these performances are sufficient.

Accordingly, it is an object of the present invention to provide a container-use surface treated steel sheet where fine particles made of nickel which form an uneven shape are formed on a surface of a steel sheet using a nickel plating bath having low nickel ion concentration so that when an organic resin is applied to the container-use surface treated steel sheet to which nickel plating is applied as a base plate, the surface treated steel sheet exhibits excellent working adhesion between the steel sheet and a coated organic resin.

It is another object of a present invention to provide an organic resin coated surface treated steel sheet which is formed by applying an organic resin to a container-use surface treated steel sheet by coating, and exhibits excellent adhesion with an organic coated resin when working such as drawing forming, drawing-redrawing forming, stretch drawing forming, stretch ironing forming or drawing-ironing forming is applied to the organic resin coated surface treated steel sheet.

It is still another object of the present invention to provide a metal can which exhibits excellent resin adhesion even after working.

It is a further object of the present invention to provide a method of manufacturing a container-use surface treated steel sheet which exhibits excellent working adhesion with the above-mentioned coated organic resin.

Means for Solving the Problems (1) a container-use surface treated steel sheet of the present invention which exhibits excellent working adhesion with a coated organic resin is characterized in that the container-use surface treated steel sheet is a surface treated steel sheet where nickel plating is applied to at least one-side surface of surfaces of a steel sheet by coating, wherein nickel plating has a fine particle shape formed by fine particles which has particle density of 2 to 500 pieces/$\mu m^2$ and having an average particle size of 0.05 to 0.7 μm.

(2) In the container-use surface treated steel sheet of the present invention described in (1), a coating weight of the nickel plating is 0.1 to 12 g/$m^2$.

(3) In the container-use surface treated steel sheet of the present invention described in (2), metal tin is contained in coating of the nickel plating.

(4) In the container-use surface treated steel sheet of the present invention described in (3), an amount of metal tin is 0.05 to 0.1 g/$m^2$.

(5) In the container-use surface treated steel sheet of the present invention described in any one of (1) to (4), an alloy layer made of iron and nickel is formed as a layer below the coating of the nickel plating.

(6) An organic-resin-coated surface treated steel sheet of the present invention is characterized in that an organic resin layer is formed on at least one surface of the container-use surface treated steel sheet described in any one of (1) to (5).

(7) An organic-resin-coated surface treated steel sheet of the present invention is characterized in that coating which contains an oxygen compound of at least one of Zr, Ti and Al is applied by coating to at least one surface of the container-use surface treated steel sheet described in any one of (1) to (5), and an organic resin layer is applied to the coating.

(8) A metal can of the present invention is characterized by being formed by working the organic-resin-coated surface steel sheet described in (6) or (7).

(9) A method of manufacturing a container-use surface treated steel sheet of the present invention is a method of manufacturing the container-use surface treated steel sheet described in any one of (1) to (5), wherein the method is characterized in that nickel is precipitated in a fine particle shape using a nickel plating bath having a low nickel ion concentration.

Advantageous Effects of the Invention

In the container-use surface treated steel sheet of the present invention, fine particles made of nickel which form an uneven shape are formed by a nickel plating bath having a low nickel ion concentration without using chromium thus providing the container-use surface treated steel plate having excellent adhesion with a coated organic resin. Further, the organic-resin-coated surface treated steel sheet manufactured by applying an organic resin to the container-use surface treated steel sheet which constitutes a base plate by coating exhibits excellent adhesion with the organic coated resin even when working such as drawing forming, drawing and redrawing forming, stretch drawing forming, stretch ironing forming, drawing and ironing forming or the like is applied to the organic-resin-coated surface treated steel sheet.

MODE FOR CARRYING OUT THE INVENTION

Figure 1:
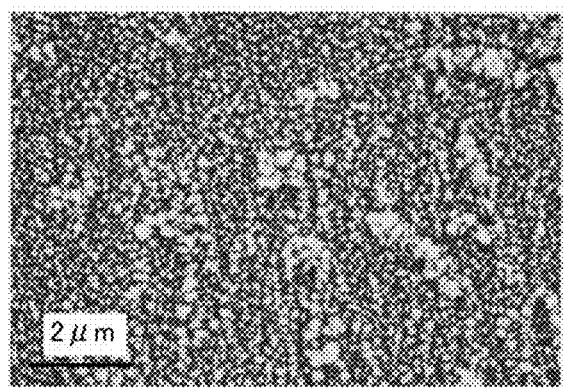
FIG. 1 is a surface observation photograph (SEM image) of a surface-treated steel sheet in a state where nickel is made to precipitate in a fine particle shape according to an example 1.

A mode for carrying out the present invention is explained in detail hereinafter with respect to a surface-treated steel sheet for a container, an organic resin coated surface-treated steel sheet, a metal can, and a manufacturing method of a surface-treated steel sheet for a container.

<Steel Sheet>

With respect to a steel sheet used as a material sheet for a surface-treated steel sheet of the present invention, it is possible to use low-carbon aluminum-killed steel generally used for manufacturing cans and containing 0.01 to 0.15 mass % of carbon.

As a material sheet for a surface-treated steel sheet of the present invention, it is also possible to use non-aging ultra low carbon aluminum-killed steel which contains less than 0.01 mass % of C and to which niobium and titanium are added.

Hot-rolled steel sheets made of these aluminum-killed steel are pickled by electrolytic pickling or the like thus removing scales on surface of the steel sheets and, thereafter, cold rolling is applied to the steel sheets. Next, the sheets are subjected to electrolytic cleaning, annealing and temper rolling so that cold-rolled steel sheets are manufactured. A nickel plating layer is formed on these cold-rolled steel sheets thus manufacturing surface-treated steel sheets.

<Plating Bath>

To obtain a nickel-plated surface-treated steel sheet having a fine particle shape whose particle density is 2 to 500 pieces/$\mu m^2$ and an average particle size of 0.05 to 0.7 μm, it is necessary to perform electrolysis plating with low precipitation efficiency by controlling an amount of electricity with high current density using a plating bath where nickel ion concentration is lower than nickel ion concentration of conventionally-used Watts bath. With the use of the plating bath of low nickel ion concentration, electrolytic precipitation with high current density is performed thus precipitating nickel having a fine particle shape.

However, when the electrolysis time is long, precipitated particles grow so that the average particle size becomes excessively large. Accordingly, it is necessary to stop the electrolysis within an appropriate short time (low amount of electricity) before the particles excessively grow.

In forming a nickel-plated layer in the manufacture of the surface-treated steel sheet according to the present invention, a following plating bath having a low nickel ion concentration can be used.

That is, it is preferable that the plating bath having a low nickel ion concentration has the composition which contains the following as main components:

5 to 35 g/L of nickel sulfate;
3 to 30 g/L of ammonium sulfate; and
3 to 30 g/L of ammonium citrate It is more preferable that the plating bath having a low nickel ion concentration has the composition which contains the following as main components:

10 to 30 g/L of nickel sulfate;
10 to 25 g/L of ammonium sulfate; and
10 to 25 g/L of ammonium citrate In this plating bath having a low nickel ion concentration, the concentration of nickel is thin and is approximately 1/10 to 1/50 of the concentration of nickel in a conventionally used nickel plating bath (Watts bath). Accordingly, it is preferable to add ammonium sulfate and ammonium citrate to the plating bath as electricity conducting agents.

Further, in forming a nickel plating layer, it is preferable to add stannous sulfate as a metal-plating assistant to accelerate granular precipitation of nickel. By adding stannous sulfate to the nickel plating bath, a trace amount of metal tin can precipitate and hence, granular precipitation of nickel is accelerated. It is considered that, by adding stannous sulfate to the nickel plating bath, a trace amount of tin precipitates prior to nickel, and nickel precipitates around the precipitated tin as a nucleus whereby fine granular nickel further easily grows.

When stannous sulfate is added to the plating bath, it is preferable to set the content of stannous sulfate to a value which falls within a range of 0.5 to 5 g/L, and it is more preferable to set the content of stannous sulfate to a value which falls within a range of 2 to 5 g/L.

When the content of stannous sulfate in the plating bath is 0.5 g/L or less, tin which constitutes a nucleus cannot precipitate. On the other hand, when the content of stannous sulfate exceeds 5 g/L, tin plating is formed on the steel sheet before nickel precipitates and hence, nickel precipitates on a tin plating layer. Accordingly, an effect of stannous sulfate which promotes the precipitation of fine granular nickel is suppressed.

With respect to a plating condition, it is preferable to set pH to a value which falls within a range of 2.2 to 4.5, to set plating bath temperature to a value which falls within a range of 25 to 55° C., and to set plating current density to a value which falls within a range of 5 to 60 A/$dm^2$.

It is more preferable to set pH to a value which falls within a range of 3.0 to 4.0, to set plating bath temperature to a value which falls within a range of 35 to 45° C., and to set plating current density to a value which falls within a range of 10 to 50 A/$dm^2$.

Using a thin plating bath where the concentration of nickel sulfate is set to a value which falls within a range of 10 to 15 g/L, the steel sheet is subjected to electrolysis with a current density of 45 to 50 A/$dm^2$ at precipitation efficiency of approximately 30% thus acquiring fine particles having particle density of 20 to 500 piece/$\mu m^2$ and an average particle size of 0.05 to 0.2 μm.

Further, using a thin plating bath where the concentration of nickel sulfate is set to a value which falls within a range of 25 to 30 g/L, the steel sheet is subjected to electrolysis with a current density of 10 to 15 A/$dm^2$ at precipitation efficiency of approximately 45% thus acquiring fine particles having particle density of 2 to 5 pieces/$\mu m^2$ and average particle size of 0.5 to 0.7 μm.

<Particle Density>

Particle density of fine granular nickel to precipitate on the steel sheet is set to a value which falls within a range of 2 to 500 pieces/$\mu m^2$.

When particle density is less than 2 pieces/$\mu m^2$, precipitated nickel particles become extremely large and hence, an area of a valley portion which corresponds to a grain boundary of precipitated nickel is decreased so that sufficient anchor effect cannot be acquired and hence, sufficient adhesive force between a steel sheet and an organic resin layer on a can wall after drawing and ironing cannot be acquired. Accordingly, particle density of 2 pieces/$\mu m^2$ or more is necessary.

When particle density exceeds 500 pieces/$\mu m^2$, precipitated nickel particles become excessively fine and hence, a plating surface shape becomes flat so that an anchor effect cannot be acquired and hence, a sufficient adhesive force between a steel sheet and an organic resin layer cannot be acquired. Accordingly, particle density of 500 pieces/μm² or less is necessary.

Particle density of particles on this steel sheet is acquired in the following manner. That is, a nickel plating surface is observed using a scanning type electron microscope (SEM) and, when the average particle size of the particles is approximately 0.5 μm or less, the number of particles which are present in a range of 1×1 μm is counted thus measuring the number of nickel particles per unit area whereby the particle density is acquired. In this case, with respect to a particle which is completely included in a frame of 1×1 μm, it is counted as one piece, and with respect to a particle which is only partially included in the frame, it is counted as 0.5 piece. This operation is performed at 5 portions on a surface of the nickel plating layer. By averaging calculated measurement results of three portions excluding the largest value and the smallest value, the particle density can be obtained.

Further, when the average particle size of the particles is approximately 0.5 μm or more, the measurement range is set to 10×10 jam and the similar operation is performed. The acquired number of particles are converted into the number of particles per 1×1 μm thus obtaining the particle density.

<Average Particle Size>

The average particle size of fine granular nickel to precipitate on the steel sheet is set to a value which falls within a range of 0.05 to 0.7 μm.

It is preferable to set the average particle size of fine granular nickel to a value which falls within a range of 0.2 to 0.5 μm. When the average particle size is less than 0.05 μm, the average particle size is small and hence, in the similar manner as described above, an area of a valley portion which corresponds to a grain boundary of precipitated nickel is decreased so that sufficient anchor effect cannot be acquired and hence, sufficient adhesive force between the steel sheet and the organic resin layer cannot be acquired.

When the average particle size exceeds 0.7 μm, in the similar manner as described above, precipitated nickel particles become extremely large and hence, an area of a valley portion which corresponds to a grain boundary of precipitated nickel is decreased so that fine particle size cannot be acquired and does not contribute to anchor effect and hence, sufficient adhesive force between a steel sheet and an organic resin layer cannot be acquired. The average particle size measurement of the fine granular nickel on the steel sheet can be acquired in the following manner. That is, from the particle density per unit area of 1×1 μm acquired by observing a nickel plating surface using a scanning type electron microscope (SEM), an average occupation area per one particle is calculated and, a diameter of a circle which corresponds to the average occupation area is calculated thus acquiring the average particle size.

<Nickel Plating Amount of Fine Granular Nickel and Amount of Metal Tin>

In view of allowing fine granular nickel to precipitate and to acquire an adhesive force between a steel sheet and an organic resin at a valley portion of the granular nickel, it is preferable to set the nickel plating amount of granular nickel on the surface of the steel sheet to a value which falls within a range of 0.1 to 12 g/m².

When the nickel plating amount of granular nickel is less than 0.1 g/m², the plating amount of precipitated nickel is small and the particle density of fine granular nickel becomes large and hence, a desired average particle size cannot be acquired. Accordingly, a sufficient adhesive force between the steel sheet and the organic resin for performing drawing and ironing cannot be acquired.

On the other hand, when the nickel plating amount of granular nickel exceeds 12 g/m², since the plating amount of precipitated nickel is large, precipitated nickel particles grow and hence, particle density of fine granular nickel becomes low whereby a desired average particle size cannot be acquired. Accordingly, a sufficient adhesive force between the steel sheet and the organic resin cannot be acquired.

Further, by adding stannous sulfate to the nickel plating bath, a trace amount of metal tin precipitates and hence, granular precipitation of nickel is accelerated. It is supposed that a trace amount of metal tin precipitates prior to nickel, and nickel precipitates around the precipitated tin as a nucleus whereby fine granular nickel grows.

Accordingly, it is preferable to make a trace amount of metal tin and nickel plating precipitate simultaneously.

It is preferable to set the trace amount of metal tin which is made to precipitate at this time to a value which falls within a range of 0.05 to 0.1 g/m².

When the amount of precipitated metal tin is less than 0.05 g/m², the metal tin is not so effective for the growth of fine granular nickel.

When the amount of precipitated metal tin exceeds 0.1 g/m², a tin plating layer is formed so that the precipitated tin hardly becomes nuclei around which granular nickel grows and hence, the growth of granular nickel is suppressed. Accordingly, the precipitated metal tin exceeding 0.1 g/m² is not preferable.

The nickel plating amount and the metal tin amount on the steel sheet are measured from a fluorescent X-ray intensity using a calibration curve formed in advance.

The surface-treated steel sheet acquired in this manner has sufficient adhesive property with the organic resin due to the anchor effect. However, by further laminating an oxygen compound formed of Zr, Ti, Al or the like on the surface-treated steel sheet, the adhesive property can be further enhanced. Although an oxygen compound formed of one element out of Zr, Ti and Al is effective, a plurality of kinds of elements may be used to form an oxygen compound.

The lamination of the oxygen compound on the surface-treated steel sheet can be performed by soaking the surface-treated steel sheet in a treatment liquid including a metal ion such as Zr, Ti and Al or by electrolytic treatment. To the treatment liquid, an organic acid, phosphate or the like may be added in addition to the metal ion depending on a usage.

Further, an alloy layer formed of ion and nickel may be formed below a nickel-plated layer on a front layer by performing heat treatment on the acquired nickel-plated surface-treated steel sheet.

<Organic Resin Layer>

The organic resin-coated surface-treated steel sheet according to the present invention can be acquired in the following manner. That is, using the surface-treated steel sheet acquired in the above-mentioned manner as a substrate, a resin film which forms an organic resin layer is laminated on one or both surfaces of the substrate thus obtaining the organic resin-coated surface-treated steel sheet.

It is preferable to name a thermoplastic resin which is still excellent in workability after heating to form such an organic resin layer.

As a thermoplastic resin, a polyolefin resin formed of one kind or more of low density polyethylene, medium low density polyethylene, high low density polyethylene, polypropylene, polybutene-1, polypentene-1, polyhexene-1, polyheptene-1, polyoctene-1, ethylene propylene copolymer, ethylene-butene-1 copolymer, ethylene-hexene copolymer or the like which are a polymer or a copolymer of 1-alkene whose carbon number is 2 to 8, a polyamide resin such as 6-nylon, 6,6-nylon or 6-10-nylon, a polyester resin formed of an acid constituted of one or more kinds of a polybasic acid such as a terephthalic acid, an isophthalic acid, an orthophthalic acid, aP-β-oxyethoxybenzoic acid, a naphthalene-2, a 6-dicarboxylic acid, a diphenoxy ethane-4, a 4-dicarboxylic acid, a 5-sodium sulfoisophthalic acid, a dibasic aromatic dicarboxlyic acid, a hexahydroterephthalic acid, a cyclohexanedicarboxylic acid, an alicyclic dicarboxylic, an adipic acid, a sebacic acid, a dimer acid, an aliphatic dicarboxylic acid, a trimellitic acid, a pyromellitic acid, a hemimellitic acid, a 1,1,2,2-ethane tetracarboxylic acid, a 1,1,2-ethane tricarboxylic acid, a 1,3,5-pentane tricarboxylic acid, a 1,2,3,4-cyclopentanetetracarboxylic acid, a biphenyl-3,4,3',4-cyclopentanetetracarboxylic acid as an acid component, and alcohol constituted of one kind or more of polyalcohol such as ethylene glycol, propylene glycol, 1,4-butanediol, neopentyl glycol, 1,6-hexylene glycol, diethylene glycol, triethylene glycol, cyclohexanedimethanol, diols, pentaerythritol, glycerol, trimethylolpropane, 1,2,6-hexane triol, sorbitol, 1,1,4,4-tetrakis(hydroxymethyl)cyclohexane may be used.

Further, such thermoplastic resin may be used as one kind of a single layer resin layer or may be used as two kinds or more of a multiple layer resin layer.

<Lamination of Organic Resin>

As a method of coating a thermoplastic resin, any one of an extrusion lamination method where a thermoplastic resin is melted by heating and is directly extruded and laminated on a plated steel sheet, a method where an unstretched film formed of a thermoplastic resin is laminated on a plated steel sheet by way of an adhesive agent, a method where the unstretched film is directly laminated on a plated steel sheet by thermal bonding without using an adhesive agent and a method where a stretched film formed of a thermoplastic resin formed by stretching in one axial direction or two axial directions and by fixing by heating is laminated on the plated steel sheet by way of an adhesive agent or, after the stretched film is directly laminated on the plated steel sheet without using the adhesive agent by thermal bonding, the orientation generated by stretching is eliminated by heating the steel sheet at a heat fixation temperature of the thermoplastic resin film or higher may be used.

Further, it is preferable that a thickness of the thermoplastic resin is set to a value which falls within a range of 10 to 100 μm.

<Formation of Metal Can>

A metal can according to the present invention can be formed by applying various forming method such as drawing, drawing-redrawing, stretch-drawing, stretch-ironing and drawing and ironing to the organic resin coated surface treated steel sheet obtained in the above-described manner.

EXAMPLES

Hereinafter, the present invention is specifically explained in conjunction with examples and comparison examples.

Example 1

In an example 1, an organic resin coated surface treated steel sheet is formed as follows, and a drawn and ironed can is formed. S peel strength of the drawn and ironed can of the example 1 is measured and a surface of the drawn and ironed can is observed, and particle density and an average particle size are obtained by the above-mentioned method.

<Preparation of Surface-treated Steel Sheet>

A cold-rolled steel sheet formed of low-carbon aluminum-killed steel having a sheet thickness of 0.25 mm and chemical compositions shown below is subjected to electrolytic degreasing in alkali aqueous solution and washing with water. Then, the steel sheet is subjected to sulfuric acid pickling and washing with water. Thereafter, the steel sheet is subjected to nickel plating under the nickel plating condition shown in Table 1 and described below thus forming a nickel plating layer having a fine particle shape where an amount of coating film of nickel plate is set to 0.1 g/m². After treatment by chromating is not performed after nickel plating.

<Chemical Composition of Steel Sheet>

0.02 mass % of C, 0.01 mass % of Si, 0.026 mass % of Mn, 0.004 mass % of P, 0.01 mass % of S, 0.033 mass % of Al, 0.002 mass % of N, and balance consisting of unavoidable impurities and Fe <Nickel Plating Bath and Plating Condition>

| nickel sulfate | 10 g/L |
|---|---|
| ammonium sulfate | 10 g/L |
| ammonium citrate | 10 g/L |
| pH | 4 |
| plating bath temperature | 45° C. |
| Plating current density | 50 A/dm² |

<Formation of Organic Resin Coated Surface-Treated Steel Sheet>

Next, on both surfaces of the above-mentioned surface treated steel sheet, a non-stretched film having a thickness of 28 μm which is made of copolymer formed of 88 mol % of ethylene terephthalate and 12 mol % of ethylene ophthalate is laminated by direct thermal bonding.

<S Peel Strength of Flat Sheet>

S peel strength is used for evaluating peel strength between a steel sheet and an organic resin of an organic resin coated surface treated steel sheet or peel strength between a side wall of a formed can produced using the organic resin coated surface treated steel sheet and an organic resin layer. A specific measuring method of S peel strength is explained hereinafter.

<Preparation Specimen for S Peel Strength Test of Flat Sheet>

Figure 8:
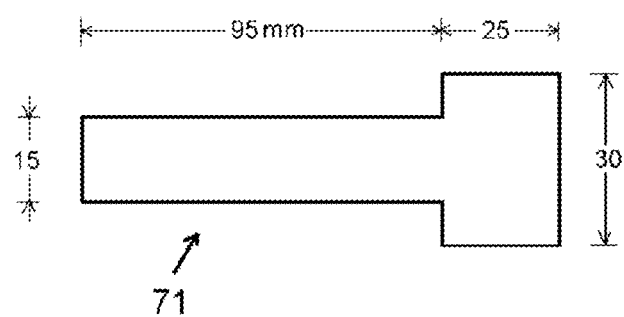
FIG. 8 is a plan view showing a shape of a specimen for measuring S peel strength.

A T-shaped specimen 71 having a size shown in FIG. 8 which is a plan view is punched out from the above-mentioned organic resin coated surface treated steel sheet using a press mold.

Figure 9:
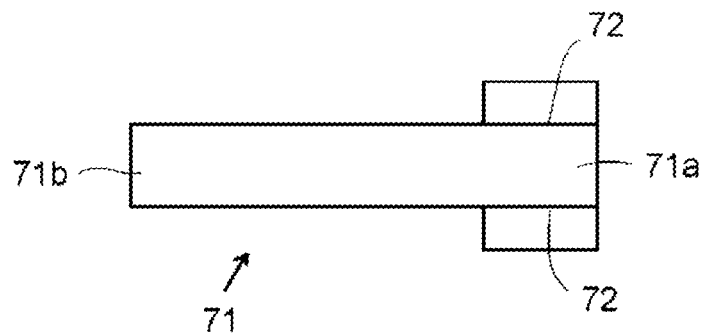
FIG. 9 is a plan view showing a state where a cut is formed in an organic resin layer of the specimen for measuring S peel strength.

Next, as shown in FIG. 9, a cut 72 is formed in a peel strength measuring surface (a viewer's side surface in the drawing) of a one (right) end portion 71a of the specimen 71 using a cutter knife such that the cut 72 reaches a surface of the surface treated steel sheet.

Figure 10:
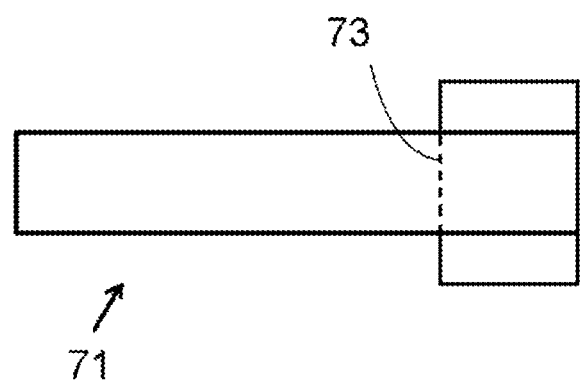
FIG. 10 is a plan view showing a state where a score is formed in the specimen for measuring S peel strength.
Figure 11:
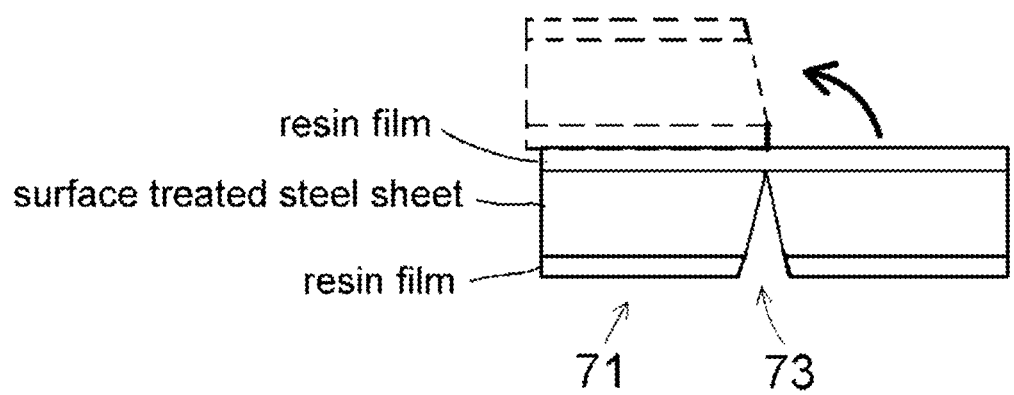
FIG. 11 is a partial cross-sectional view of the specimen for measuring S peel strength showing a shape of a portion where the score is formed.

Further, as shown in FIG. 10 and FIG. 11, a score 73 is formed in the side (the back side surface in the drawing) opposite to the peel strength measuring surface (the surface in which the cut 72 is formed) using a score forming die set and, thereafter, the score portion is folded and only the surface treated steel sheet is cut.

Here, the organic resin layer is not cut on the peel strength measuring surface, and the organic resin layer remains on both sides of surface treated steel sheets separated by cutting in a connected state.

<Measurement of S Peel Strength of Flat Sheet>

Figure 12:
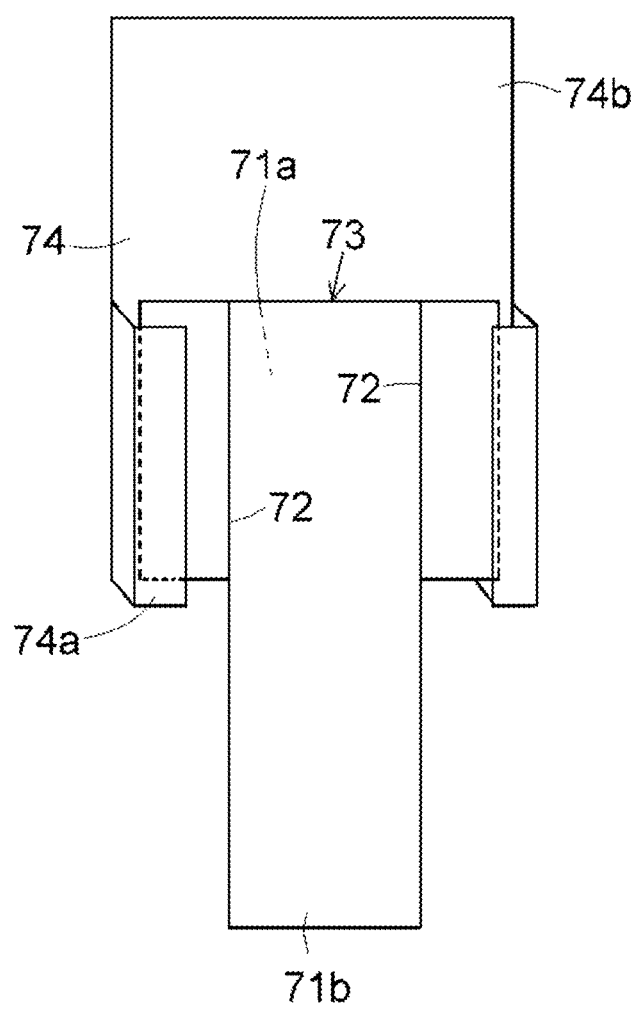
FIG. 12 is a schematic perspective view showing a state where strength is measured by putting the specimen for measuring S peel strength in a specimen holder.
Figure 13:
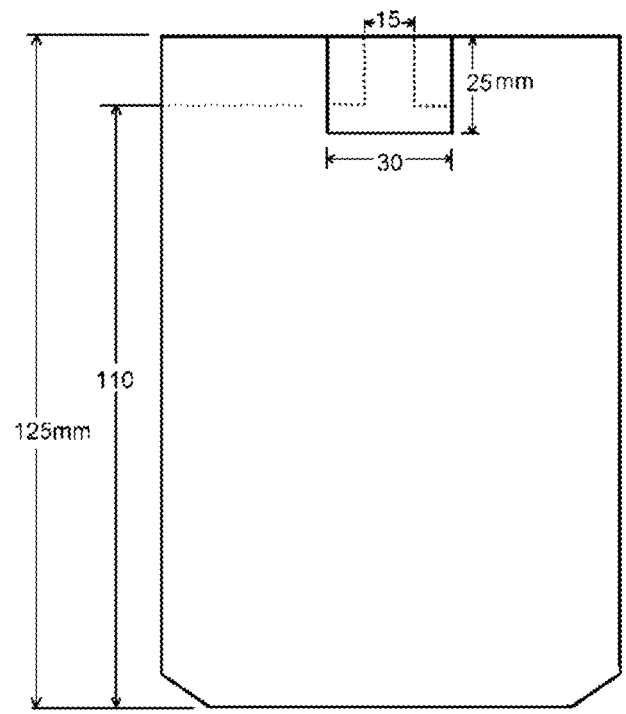
FIG. 13 is a side view of a drawn and ironed can and a portion where the specimen for measuring S peel strength is cut out.

Next, as shown in FIG. 12, one end portion 71a is inserted into a specimen insertion portion 74a of a specimen holder 74 thus fixing the specimen 71 in the specimen holder 74 and, thereafter, an upper portion 74b of the specimen holder 74 and the other end portion 71b of the specimen 71 are pulled from each other while being clamped by both chuck portions of a tensile tester at a tension speed of 20 mm/sec, and the organic resin layer is forcibly peeled off from the surface treated steel sheet, and tensile strength is measured, and this value is set as S peel strength.

<Evaluation of S Peel Strength of Flat Sheet>

The S peel strength measured as described above is preferably equal to 1.0 kgf/15 mm or more when a specimen has a width of 15 mm. When the S peel strength is less than 1.0 kgf/15 mm, the stable workability in rigorous forming working such as can making working where stretching and/or ironing are further performed after drawing cannot be acquired.

<Formation of Drawn Can>

Next, a blank having a diameter of 150 mm is punched out from the above-mentioned organic resin coated surface treated steel sheet and, thereafter, drawing is applied to the blank with a drawing ratio of 1.67 thus forming a drawn can having a can diameter of 90 mm and a can height of approximately 40 mm.

<Formation of Drawn-ironed Can>

Next, redrawing is applied to the drawn can with a drawing ratio of 1.36 thus forming a redrawn can having a can diameter of 66 mm. Thereafter, drawing and ironing working is performed in such a manner that ironing working is applied to the redrawn can so that the reduction ration of sheet thickness becomes 50% using tree-step ironing thus forming a drawn and ironed can having a can diameter of 66 mm and a can height of approximately 125 mm.

<S Peel Strength of can Wall of Drawn and Ironed Can>

S peel strength of can wall of drawn and ironed can is used for measuring peel strength between a steel sheet of a side wall of the drawn and ironed can and an organic resin layer at a portion 110 mm from a can bottom.

A specific measuring method of S peel strength of a drawn and iron can is explained hereinafter.

<Preparation of Specimen for S Peel Test of can Wall of Drawn and Ironed Can>

Figure 14:
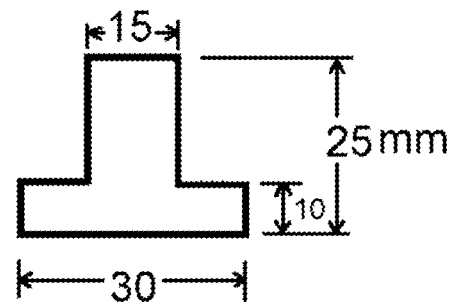
FIG. 14 is a plan view showing a shape of the specimen for measuring S peel strength of a can wall of the drawn and ironed can.

A specimen 81 is cut out from the above-mentioned can wall of the drawn and ironed can 80 in such a manner that a strip of 25 mm from an opening end portion in the can bottom direction by 30 mm in the circumferential direction of the opening end portion. A T-shaped specimen 71' having a size shown in FIG. 14 is punched out using a press mold such that a portion which forms a score 73' of the T-shaped specimen 71' is arranged at 110 mm from a can bottom 80a.

Figure 15:
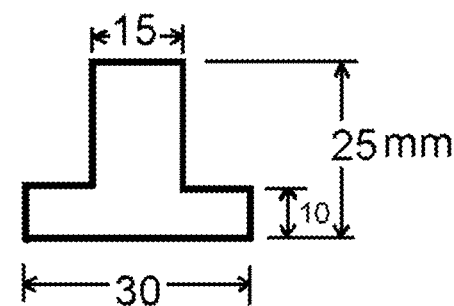
FIG. 15 is a plan view showing a state where the cut is formed in an organic resin layer of the specimen for measuring S peel strength of the can wall of the drawn and ironed can.

Next, as shown in FIG. 15, a cut 72' is formed in a peel strength measuring surface (a viewer's side surface in the drawing) of a one (lower) end portion 71a' of the specimen 71' using a cutter knife such that the cut 72' reaches a surface of the surface treated steel sheet.

Figure 16:
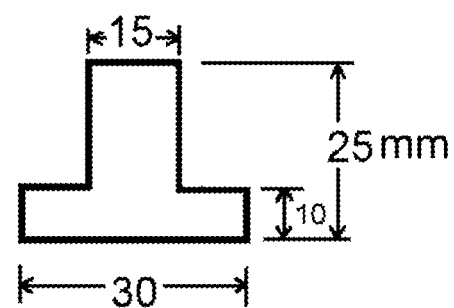
FIG. 16 is a plan view showing a state where the score is formed in the specimen for measuring S peel strength of the can wall of the drawn and ironed can.

Further, as shown in FIG. 16 and FIG. 11, a score 73' is formed in the side (back side surface in the drawing) opposite to the peel strength measuring surface (the surface in which the cut 72' is formed) using a score forming die set and, thereafter, the score portion is folded and only the surface treated steel sheet is cut.

Here, the organic resin layer is not cut on the peel strength measuring surface, and the organic resin layer remains on both sides of surface treated steel sheets separated by cutting in a connected state.

<Measurement of S Peel Strength of can Wall of Drawn and Ironed Can>

Next, as shown in FIG. 12, in the same manner as the steps of measuring S peel strength of flat sheet, one end portion 71a' is inserted into a specimen insertion portion 74a of a specimen holder 74 thus fixing the specimen 71' in the specimen holder 74 and, thereafter, an upper portion 74b of the specimen holder 74 and the other end portion 71b' of the specimen 71' are pulled from each other while being clamped by both chuck portions of a tensile tester at a tension speed of 20 mm/sec, and the organic resin layer is forcibly peeled off from the surface treated steel sheet, and tensile strength is measured, and this value is set as S peel strength.

<Evaluation of S Peel Strength of can Wall of Drawn and Ironed Can>

To prevent the organic resin layer from being peeled off from the steel sheet during drawing and ironing and after drawing and ironing at the time of forming flange, it is preferable that the S peel strength of the can wall of the drawn and ironed can is set to 1.0 kgf/15 mm or more.

Further, to suppress the generation of hair at the time of formation due to the organic resin layer, it is more preferable that the S peel strength of the can wall is set to 1.5 kgf/15 mm or more, and it is further more preferable that the organic resin layer is ruptured without being peeled off from the steel sheet at the time of measuring the S peel strength.

It is supposed that, when various forming workings such as drawing and ironing are performed, fine cracks are generated along valley portions of fine granular particles in the plating layer during working, and an anchor effect on a plating surface is maintained by these fine cracks along the valley portions of the fine granular particles after working and hence, favorable peel strength between the steel sheet and the organic resin layer can be acquired.

<Surface Observation Photograph>

The amount of coating film, the particle density, the average particle size and result of evaluation of the S peel strength of a surface-treated steel sheet of the example 1 are shown in Table 2, and a surface observation photograph (SEM image) of the surface-treated steel sheet of the example 1 is shown in FIG. 1.

When the amount of nickel coating film formed on the surface-treated steel sheet of the example 1 is 0.1 g/m$^2$, fine granular nickel is observed. That is, the surface-treated steel sheet of the example 1 exhibits the particle density of 504 pieces/μm$^2$ and the average particle size of 0.05 μm thus acquiring the S peel strength of a flat sheet of 1.9 kgf/15 mm.

Accordingly, the surface-treated steel sheet of the example 1 can be subjected to drawing and ironing. In this case, S peel strength of a can wall of a drawn and ironed can is 1.6 kgf/15 mm so that the drawn and ironed can acquires favorable peel strength.

Example 2

In an example 2, a drawn and ironed can is formed by laminating an organic resin on a steel sheet in the similar manner as the example 1 except for that electrolysis time is changed in accordance with conditions described in Table 1 using the nickel plating bath of the example 1 thus setting an amount of coating film of nickel plate to 2.4 g/m$^2$, and particle density, an average particle size and S peel strength of the surface-treated steel sheet of the example 2 are obtained.

Figure 2:
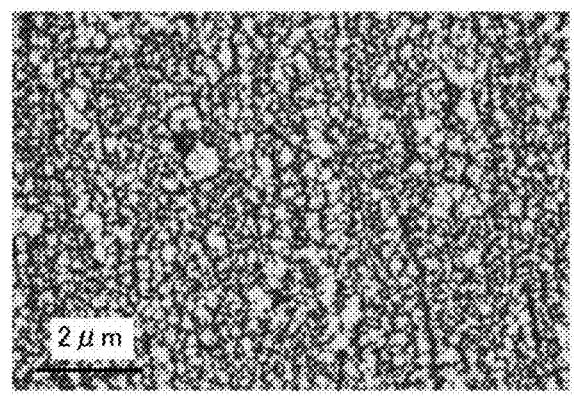
FIG. 2 is a surface observation photograph (SEM image) of a surface-treated steel sheet in a state where nickel is made to precipitate in a fine particle shape according to an example 2.

The amount of coating film, the particle density, the average particle size and result of evaluation of the S peel strength of the surface-treated steel sheet of the example 2 are shown in Table 2, and a surface observation photograph (SEM image) of the surface-treated steel sheet of the example 2 is shown in FIG. 2.

When the amount of nickel coating film of the surface-treated steel sheet of the example 2 is 2.4 g/m$^2$, fine granular nickel is observed. That is, the surface-treated steel sheet of the example 2 exhibits the particle density of 26.2 pieces/μm$^2$ and the average particle size of 0.21 μm thus acquiring the S peel strength of a flat sheet of 2.0 kgf/15 mm.

Accordingly, the surface-treated steel sheet of the example 2 can be subjected to drawing and ironing. In this case, S peel strength of a can wall of a drawn and ironed can is 2.1 kgf/15 mm so that the drawn and ironed can acquires favorable peel strength.

Example 3

In an example 3, a drawn and ironed can is formed by laminating an organic resin on a steel sheet in the similar manner as the example 1 except for that concentration of nickel sulfate of the nickel plating bath of the example 1 is set to 30 g/L and electrolysis time is changed in accordance with conditions described in Table 1 thus setting an amount of coating film of nickel plate to 10.0 g/m$^2$, and particle density, an average particle size and S peel strength of the surface-treated steel sheet of the example 3 are obtained.

The amount of coating film, the particle density, the average particle size and result of evaluation of the S peel strength of the surface-treated steel sheet of the example 3 are shown in Table 2.

When the amount of nickel coating film formed on the surface-treated steel sheet of the example 3 is 10 g/m$^2$, fine granular nickel is observed. That is, the surface-treated steel sheet of the example 3 exhibits the particle density of 4.5 pieces/μm$^2$ and the average particle size of 0.5 μm thus acquiring the S peel strength of a flat sheet of 2.1 kgf/15 mm.

Accordingly, the surface-treated steel sheet of the example 3 can be subjected to drawing and ironing. In this case, S peel strength of a can wall of a drawn and ironed can is 1.8 kgf/15 mm so that the drawn and ironed can acquires favorable peel strength.

Example 4

In an example 4, a drawn and ironed can is formed by laminating an organic resin on a steel sheet in the similar manner as the example 1 except for that electrolysis time is changed in accordance with conditions described in Table 1 using the nickel plating bath of the example 1 thus setting an amount of coating film of nickel plate to 12.0 g/m$^2$, and particle density, an average particle size and S peel strength of the surface-treated steel sheet of the example 4 are obtained.

Figure 3:
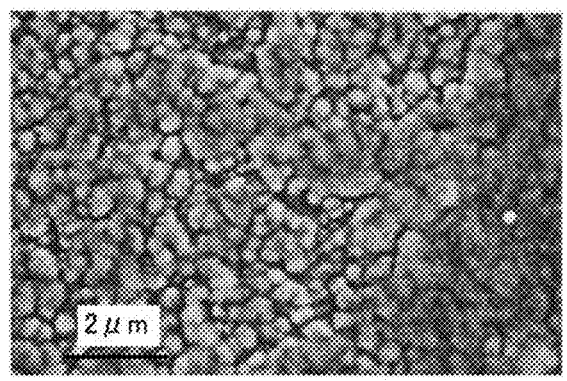
FIG. 3 is a surface observation photograph (SEM image) of a surface-treated steel sheet in a state where nickel is made to precipitate in a fine particle shape according to an example 4.

The amount of coating film, the particle density, the average particle size and result of evaluation of the S peel strength of the surface-treated steel sheet of the example 4 are shown in Table 2, and a surface observation photograph (SEM image) of the surface-treated steel sheet of the example 4 is shown in FIG. 3.

When the amount of nickel coating film of the example 4 is 12 g/m$^2$, fine granular nickel is observed. That is, the surface-treated steel sheet of the example 4 exhibits the particle density of 2.2 pieces/μm$^2$ and the average particle size of 0.7 μm thus acquiring the S peel strength of a flat sheet of 1.9 kgf/15 mm.

Accordingly, the surface-treated steel sheet of the example 4 can be subjected to drawing and ironing. In this case, S peel strength of a can wall of a drawn and ironed can is 1.9 kgf/15 mm so that the drawn and ironed can acquires favorable peel strength.

Example 5

In an example 5, a drawn and ironed can is formed by laminating an organic resin on a steel sheet in the similar manner as the example 1 except for that ferrous sulfate of 2 g/L is added to the nickel plating bath of the example 1 and an amount of coating film of nickel plate is set to 2.5 g/m$^2$ which is substantially equal to the amount of nickel coating film of the example 2 in accordance with conditions described in Table 1, and particle density, an average particle size and S peel strength of the surface-treated steel sheet of the example 5 are obtained.

Figure 4:
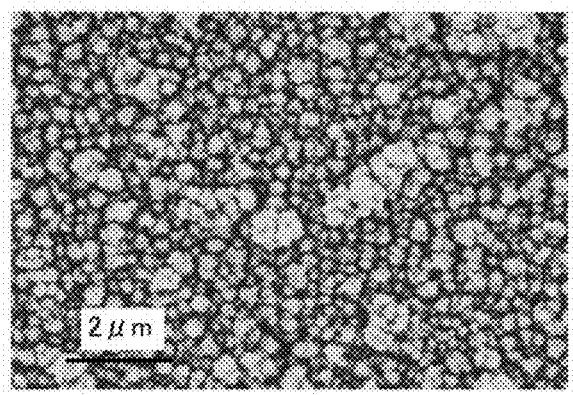
FIG. 4 is a surface observation photograph (SEM image) of a surface-treated steel sheet in a state where nickel is made to precipitate in a fine particle shape according to an example 5.

The amount of coating film, the particle density, the average particle size and result of evaluation of the S peel strength of the surface-treated steel sheet of the example 5 are shown in Table 2, and a surface observation photograph (SEM image) of the surface-treated steel sheet of the example 5 is shown in FIG. 4.

When the amount of nickel coating film and an amount of metallic tin of the example 5 are 2.5 g/m$^2$ and 0.06 g/m$^2$ respectively, fine granular nickel is observed. That is, the surface-treated steel sheet of the example 5 exhibits the particle density of 4.4 pieces/μm$^2$ and the average particle size of 0.5 μm thus acquiring the S peel strength of a flat sheet of 1.9 kgf/15 mm.

In comparison with the example 2, although the amount of nickel coating film of the example 5 is almost equal to the amount of nickel coating film of the example 2, the average particle size of the example 5 is larger than the average particle size of the example 2. It is supposed that, by adding trace amount of ferrous sulfate to the nickel plating bath, trace amount of metallic tin precipitates, and nickel precipitates and grows around the trace amount of metallic tin using the trace amount of metallic tin as a nucleus and hence, granular precipitation is induced thus increasing an average particle size and fine granular particles are further grown.

Further, in comparison with the example 3, although the amount of coating film of nickel plate of the example 5 is smaller, subsequently equal particle density and average particle size can be obtained.

Accordingly, the surface-treated steel sheet of the example 5 can be subjected to drawing and ironing. In this case, S peel strength of a can wall of a drawn and ironed can is 1.9 kgf/15 mm so that the drawn and ironed can acquires favorable peel strength.

Example 6

In an example 6, a drawn and ironed can is formed by laminating an organic resin on a steel sheet in the similar manner as the example 1 except for that electrolysis time is changed in accordance with conditions described in Table 1 using the nickel plating bath of the example 5 thus setting an amount of coating film of nickel plate to 3.8 g/m$^2$, and particle density, an average particle size and S peel strength of the surface-treated steel sheet of the example 6 are obtained.

The amount of coating film, the particle density, the average particle size and result of evaluation of the S peel strength of the surface-treated steel sheet of the example 6 are shown in Table 2.

When the amount of nickel coating film and an amount of metallic tin of the example 6 are 3.8 g/m² and 0.09 g/m² respectively, fine granular nickel is observed. That is, the surface-treated steel sheet of the example 6 exhibits the particle density of 5 pieces/µm² and the average particle size of 0.6 µm thus acquiring the S peel strength of a flat sheet of 1.7 kgf/15 mm.

In comparison with the example 3, although the amount of coating film of nickel plate of the example 6 is smaller, granular precipitation is induced and hence, subsequently equal particle density and average particle size can be obtained. Accordingly, it is understood that fine granular particles are further grown.

Accordingly, the surface-treated steel sheet of the example 6 can be subjected to drawing and ironing. In this case, S peel strength of a can wall of a drawn and ironed can is 1.9 kgf/15 mm so that the drawn and ironed can acquires favorable peel strength.

Comparison Example 1

In a comparison example 1, a drawn and ironed can is formed by laminating an organic resin on a steel sheet in the similar manner as the example 1 except for that electrolysis time is changed in accordance with conditions described in Table 1 using the nickel plating bath of the example 1 thus setting an amount of coating film of nickel plate to 0.04 g/m², and particle density, an average particle size and S peel strength of the surface-treated steel sheet of the comparison example 1 are obtained.

The particle density, the average particle size and result of evaluation of S peel strength of the surface-treated steel sheet of the comparison example 1 are shown in Table 2.

Since the amount of coating film of nickel plate is small, particle density of nickel is increased so that particle density of nickel becomes 712 pieces/µm², and the average particle size is 0.04 µm. Accordingly, S peel strength of a can wall of a drawn and ironed can is 0.7 kgf/15 mm and hence, the drawn and ironed can cannot acquire favorable peel strength.

Comparison Example 2

In a comparison example 2, a drawn and ironed can is formed by laminating an organic resin on a steel sheet in the similar manner as the example 1 except for that an amount of coating film of nickel plate is set to 2.5 g/m² in accordance with conditions described in Table 1 and the following plating conditions using an ordinary nickel plating bath (Watts bath), and particle density, an average particle size and S peel strength of the surface-treated steel sheet of the comparison example 2 are obtained.
Plating Conditions:

| | |
|---|---|
| nickel sulfate | 240 g/L |
| nickel Cl² | 45 g/L |
| boric acid | 30 g/L |
| additive | 2 g/L |
| pH | 4 |
| plating bath temperature | 45° C. |
| plating current density | 5 A/dm² |

Figure 5:
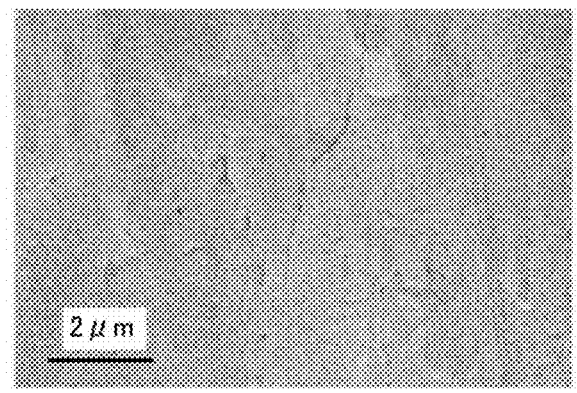
FIG. 5 is a surface observation photograph (SEM image) of a surface-treated steel sheet manufactured by a conventional ordinary Watts bath according to a comparison example 2.

The particle density, the average particle size and result of evaluation of the S peel strength of the surface-treated steel sheet of the comparison example 2 are shown in Table 2, and a surface observation photograph (SEM image) of the surface-treated steel sheet of the comparison example 2 is shown in FIG. 5.

Granular precipitation of nickel is not observed, and S peel strength of a can wall of a drawn and ironed can is 0.6 kgf/15 mm and hence, the drawn and ironed cannot acquire sufficient peel strength.

Comparison Example 3

In a comparison example 3, a drawn and ironed can is formed by laminating an organic resin on a steel sheet in the similar manner as the example 1 except for that a total of an amount of coating film of Cr plate in terms of chromium metal and an amount of coating film of Cr plate in terms of chromium hydrated oxide is set to 120 g/m² in accordance with plating conditions described in Table 1 and the following plating conditions using an ordinary Cr plating bath (TFS bath), and particle density, an average particle size and S peel strength of the surface-treated steel sheet of the comparison example 3 are obtained.
Plating Conditions:

| | |
|---|---|
| chromic anhydride | 100 g/L |
| sodium fluoride | 5 g/L |
| bath temperature | 40° C. |
| current density | 40 A/dm² |

Figure 6:
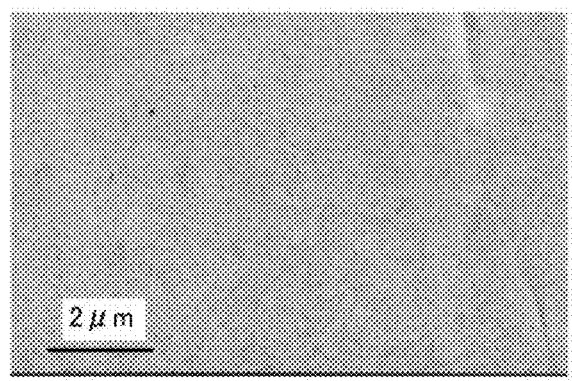
FIG. 6 is a surface observation photograph (SEM image) of a surface-treated steel sheet manufactured by a conventional ordinary TFS bath according to a comparison example 3.

The particle density, the average particle size and result of evaluation of the S peel strength of the surface-treated steel sheet of the comparison example 3 are shown in Table 2, and a surface observation photograph (SEM image) of the surface-treated steel sheet of the comparison example 3 is shown in FIG. 6.

Although granular precipitation of nickel is not observed, since using an ordinary TFS, S peel strength of a can wall of a drawn and ironed can is 1.0 kgf/15 mm and hence, the drawn and ironed can acquires sufficient peel strength.

Comparison Example 4

In a comparison example 4, a drawn and ironed can is formed by laminating an organic resin on a steel sheet in the similar manner as the example 1 except for that an amount of coating film of tin plate is set to 2 g/m² in accordance with plating conditions described in Table 1 and the following plating conditions using an ordinary tin plating bath (Ferosutan bath), and particle density, an average particle size and S peel strength of the surface-treated steel sheet of the comparison example 4 are obtained.
Plating Conditions:

| | |
|---|---|
| stannous sulfate | 70 g/L |
| PSA (phenol sulfonic acid) | 60 g/L |
| Additive A (etoxylation-α-naphthol) | 3 g/L |
| Additive B (etoxynaphthol sulfone acid) | 3 g/L |
| bath temperature | 40° C. |
| current density | 10 A/dm² |

Figure 7:
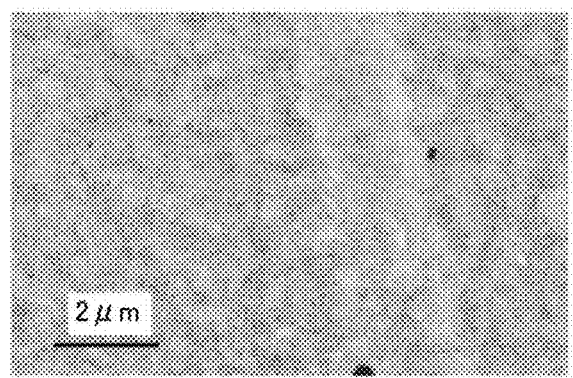
FIG. 7 is a surface observation photograph (SEM image) of a surface-treated steel sheet manufactured by a conventional ordinary tin-plating bath according to a comparison example 4.

The particle density, the average particle size and result of evaluation of the S peel strength of the surface-treated steel sheet of the comparison example 4 are shown in Table 2, and a surface observation photograph (SEM image) of the surface-treated steel sheet of the comparison example 2 is shown in FIG. 7.

Although granular precipitation of nickel is observed, S peel strength of a can wall of a drawn and ironed can is 0.4 kgf/15 mm and hence, the drawn and ironed can cannot acquire sufficient peel strength.

<General Evaluation of Drawn and Ironed Can>

General evaluation of peel strength of the drawn and ironed can by S peel strength using TFS which has been conventionally used as a raw material of organic resin coated drawn and ironed can is made as follows. The evaluation result is shown in Table 2.

Mark "excellent": peel strength after ironing is higher than the peel strength of TFS after ironing Mark "good": peel strength of TFS after ironing Mark "bad": peel strength after ironing is lower than the peel strength of TFS after ironing With respect to TFS which has been conventionally used as a raw material of organic resin coated drawn and ironed can, S peel strength of a flat sheet is 2.1 kgf/15 mm, and S peel strength of a can wall after drawing and ironing is 1.0 kgf/15 mm.

Whereas, all of S peel strengths of flat sheets of the examples 1 to 6 according to the present invention are substantially equal to the S peel strength of the flat sheet of TFS and are approximately 2 kgf/15 mm, and S peel strengths of can walls after drawing and ironing are not decreased after working, and high S peel strength of approximately 2 kgf/15 mm can be acquired.

The reason why the peel strength of the organic resin layer is not decreased after drawing and ironing, it is supposed that fine cracks are generated along valley portions of fine granular particles in the plating layer during working, and an anchor effect on a plating surface is maintained by these fine cracks along the valley portions of the fine granular particles after working and hence, favorable peel strength between the steel sheet and the organic resin layer can be acquired.

Although S peel strengths of flat sheets of the comparison examples 1, 2 and 4 are substantially equal to the S peel strength of TFS, the peel strengths are lowered after drawing and ironing and hence, the flat sheets of the comparison examples 1, 2 and 4 exhibit lower peel strengths than the TFS material.

TABLE 1

| | | | bath concentration (g/L) | | | plating condition | | |
| | | | | | | current | | precipitation |
| | kind of plating | plating bath | nickel sulfate | stannous sulfate | chromic anhydride | density (A/dm$^2$) | electrol-ysis time | efficiency (%) |
| --- | --- | --- | --- | --- | --- | --- | --- | --- |
| example 1 | Ni | present invention bath | 10 | | | 50 | 0.2 | 33 |
| example 2 | Ni | present invention bath | 10 | | | 50 | 5.0 | 32 |
| example 3 | Ni | present invention bath | 30 | | | 10 | 71.5 | 46 |
| example 4 | Ni | present invention bath | 30 | | | 10 | 88.0 | 45 |
| example 5 | Ni | present invention bath (Sn added) | 30 | 2 | | 10 | 18.0 | 46 |
| example 6 | Ni | present invention bath (Sn added) | 30 | 5 | | 10 | 26.5 | 47 |
| comparison example 1 | Ni | present invention bath | 10 | | | 50 | 0.1 | 30 |
| comparison example 2 | Ni | Watts bath | 240 | | | 5 | 18.0 | 92 |
| comparison example 3 | TFS | TFS bath | | | 100 | 40 | 1.2 | 22 |
| comparison example 4 | tin plate | tin plating bath | | 70 | | 10 | 3.5 | 93 |

| | | | amount of coating film | | | particle density (pieces/μm$^2$) | average particle size (μm) | S peel strength of flat sheet (kgf/15 mm) | S peel strength of can wall of drawn and ironed can (kgf/15 mm) | Comprehensive evaluation of drawn and ironed can |
| | kind of plating | plating bath | Ni (g/m$^2$) | Sn (g/m$^2$) | Cr (g/m$^2$) | | | | | |
| --- | --- | --- | --- | --- | --- | --- | --- | --- | --- | --- |
| example 1 | Ni | present invention bath | 0.10 | | | 504.0 | 0.05 | 1.9 | 1.6 | excellent |
| example 2 | Ni | present invention bath | 2.40 | | | 26.2 | 0.20 | 2.0 | 2.1 | excellent |
| example 3 | Ni | present invention bath | 10.00 | | | 4.5 | 0.50 | 2.1 | 1.8 | excellent |
| example 4 | Ni | present invention bath | 12.00 | | | 2.2 | 0.70 | 1.9 | 1.9 | excellent |
| example 5 | Ni | present invention bath (Sn added) | 2.50 | 0.06 | | 4.4 | 0.50 | 1.8 | 1.9 | excellent |
| example 6 | Ni | present invention bath (Sn added) | 3.80 | 0.09 | | 5.0 | 0.50 | 1.7 | 1.7 | excellent |
| comparison example 1 | Ni | present invention bath | 0.04 | | | 712.0 | 0.04 | 1.6 | 0.7 | bad |
| comparison example 2 | Ni | Watts bath | 2.50 | | | no granular precipitation | no granular precipitation | 1.7 | 0.6 | bad |

TABLE 1-continued

| | | | | | | | | | |
|---|---|---|---|---|---|---|---|---|---|
| comparison example 3 | TFS | TFS bath | | 120 | no granular precipitation | no granular precipitation | 2.1 | 1.0 | good |
| comparison example 4 | tin plate | tin plating bath | 2 | | 3.0 | 0.65 | 1.9 | 0.4 | bad | excellent: peel strength after drawing is higher than TFS
good: peel strength of TFS after drawing
bad: peel strength after drawing is lower than TFS

INDUSTRIAL APPLICABILITY

In the container-use surface treated steel sheet of the present invention, fine particles made of nickel which form an uneven shape are formed by a nickel plating bath having a low nickel ion concentration without using chromium thus providing the container-use surface treated steel plate having excellent adhesion with a coated organic resin. Further, the organic-resin-coated surface treated steel sheet manufactured by applying an organic resin to the container-use surface treated steel sheet which constitutes a base plate by coating exhibits excellent adhesion with the organic coated resin even when working such as drawing forming, drawing and redrawing forming, stretch drawing forming, stretch ironing forming, drawing and ironing forming or the like is applied to the organic-resin-coated surface treated steel sheet. Still further, the metal can formed by using such an organic resin coated surface treated steel sheet exhibits excellent adhesion with a resin even after working. In this manner, the present invention has extremely high industrial applicability.

71: specimen
71a: one end portion of specimen
71b: the other end portion of specimen
72: cut
73: score
74: specimen holder
74a: specimen insertion portion
74b: upper portion of specimen holder
80: drawn and ironed can
80a: can bottom of drawn and ironed can
80b: opening end portion of drawn and ironed can
81: specimen cut out from wall of drawn and ironed can
71': specimen from wall of drawn and ironed can
71a': one end portion of specimen from wall of drawn and ironed can
71b': the other end portion of specimen from wall of drawn and ironed can
72': cut of specimen from wall of drawn and ironed can
73': score of specimen from wall of drawn and ironed can

The invention claimed is:

1. A surface treated steel sheet where nickel plating and no chromating is applied to at least one-side surface of surfaces of a steel sheet by coating, wherein
the nickel plating has a fine particle shape formed by fine particles which has particle density of 2 to 500 pieces/μm$^2$ and having an average particle size of 0.05 to 0.7 μm; and an organic resin layer directly formed on the nickel plating.

2. The surface treated steel sheet according to claim 1, wherein a coating weight of the nickel plating is 0.1 to 12 g/m$^2$.

3. The surface treated steel sheet according to claim 1, wherein metal tin is contained in the coating of the nickel plating.

4. The surface treated steel sheet according to claim 3, wherein an amount of metal tin is 0.05 to 0.1 g/m$^2$.

5. The surface treated steel sheet according to claim 1, wherein an alloy layer made of iron and nickel is formed as a layer below the coating of the nickel plating.

6. A metal can being characterized by being formed by working the surface treated steel sheet according to claim 1.

7. A method of manufacturing a surface treated steel sheet, the surface treated steel sheet according to claim 1, wherein nickel is precipitated in a fine particle shape using a nickel plating bath having a low nickel ion concentration.

8. The surface treated steel sheet according to claim 2, wherein an alloy layer made of iron and nickel is formed as a layer below the coating of the nickel plating.

9. The surface treated steel sheet according to claim 3, wherein an alloy layer made of iron and nickel is formed as a layer below the coating of the nickel plating.

* * * * *